United States Patent
Hasken et al.

(10) Patent No.: US 7,380,457 B2
(45) Date of Patent: Jun. 3, 2008

(54) MECHANICAL RETAINER FOR SAW TORQUE SENSOR BUTTON

(75) Inventors: Randall J. Hasken, Lanark, IL (US); Larry J. Bohnert, Monroe, WI (US); Steven J. Magee, Lena, IL (US)

(73) Assignee: Honeywell International Inc., Morristown, NJ (US)

( * ) Notice: Subject to any disclaimer, the term of this patent is extended or adjusted under 35 U.S.C. 154(b) by 291 days.

(21) Appl. No.: 11/317,122

(22) Filed: Dec. 23, 2005

(65) Prior Publication Data

US 2007/0144278 A1    Jun. 28, 2007

(51) Int. Cl.
*G01D 9/00* (2006.01)
(52) U.S. Cl. .................................. 73/650; 73/866.5
(58) Field of Classification Search ................ 73/650
See application file for complete search history.

(56) References Cited

U.S. PATENT DOCUMENTS

| 3,125,983 A * | 3/1964 | Valus ........................... 116/74 |
| 3,139,598 A | 6/1964 | Ruge |
| 4,454,765 A * | 6/1984 | Lodge ........................... 73/724 |
| 6,188,025 B1 * | 2/2001 | Hanai et al. ............. 174/102 R |
| 6,293,539 B1 * | 9/2001 | Fukatsu et al. ............. 271/126 |
| 6,412,346 B2 * | 7/2002 | Barkai et al. ................. 73/493 |
| 7,026,943 B2 * | 4/2006 | Knowles et al. ............ 340/582 |
| 2003/0000309 A1 * | 1/2003 | Lonsdale et al. ............. 73/650 |
| 2005/0000296 A1 * | 1/2005 | Kopp et al. .................. 73/756 |
| 2005/0193839 A1 * | 9/2005 | Gronvall ..................... 73/866.5 |

FOREIGN PATENT DOCUMENTS

| EP | 0127278 A1 | 12/1984 |
| GB | 2305729 A | 4/1997 |

* cited by examiner

*Primary Examiner*—Robert R Raevis
(74) *Attorney, Agent, or Firm*—William B. Shelby; Kermit D. Lopez; Luis M. Ortiz

(57) ABSTRACT

A device for mounting a sensor on a device being subjected to torque such as a shaft or plate in the form of a retaining ring having an opening or chamber sized to hold the sensor. The ring has a first open end for insertion of the sensor into the chamber or opening and a second end having a lip for retaining the sensor in the opening. The second end has an opening for the sensor wires or other connecting elements. The ring has threads on the outer periphery of the retaining ring for engaging similar threads on the device being subjected to torque.

18 Claims, 1 Drawing Sheet

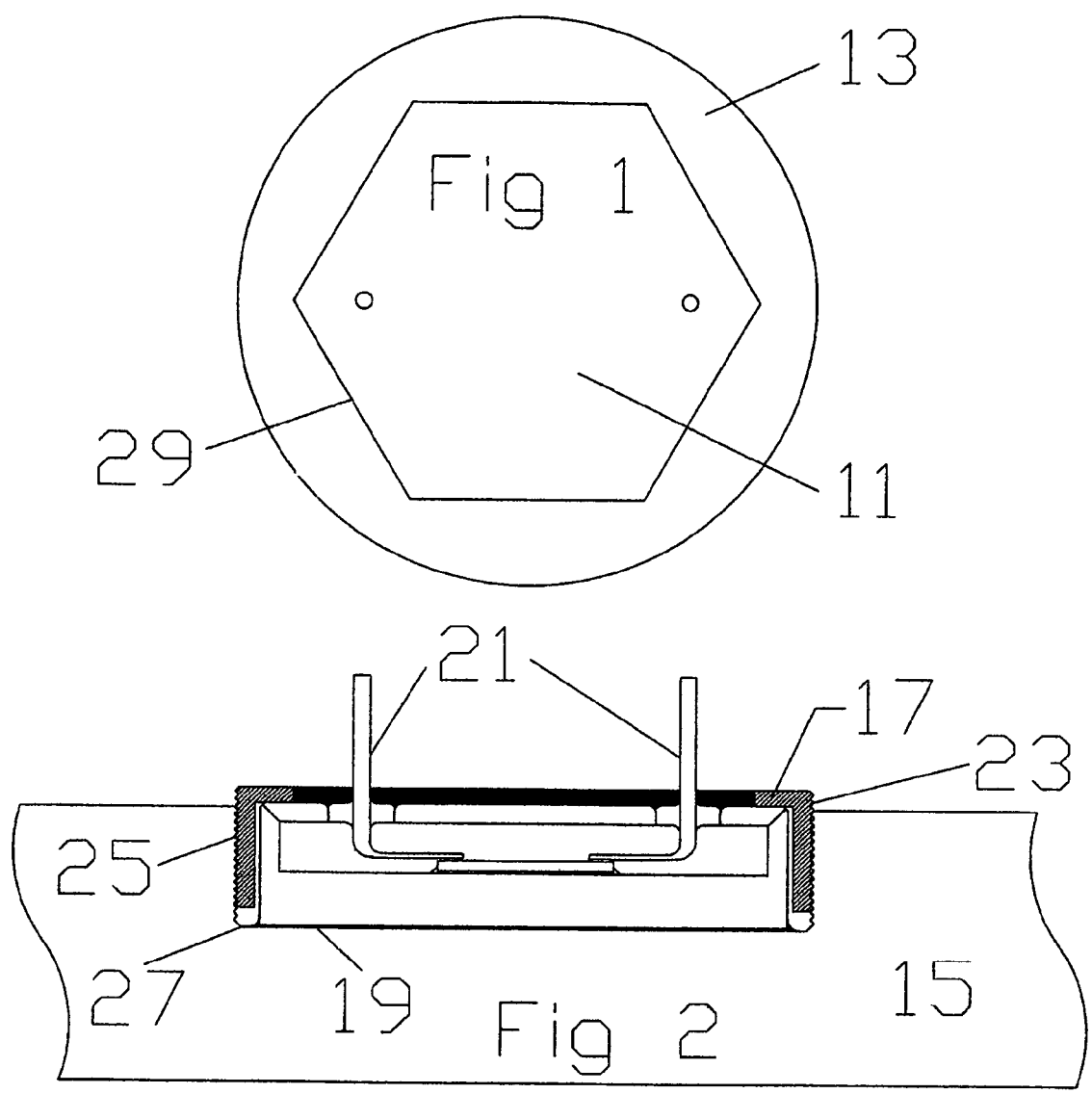

MECHANICAL RETAINER FOR SAW TORQUE SENSOR BUTTON

FIELD OF THE INVENTION

The present invention relates to Surface Acoustic Wave (SAW) torque sensors. More particularly, the invention relates to an improved attachment of the sensor button on a SAW torque sensor.

BACKGROUND OF THE INVENTION

Surface Acoustic Wave (SAW) Torque Sensing is an emerging technology for automotive, transportation, rail and other similar industries for use in power train and chassis applications. Significant research and development efforts have allowed for mass-production of SAW torque sensors at a cost-effective price. Certain engine, transmission, driveline and chassis processes can often be controlled more precisely using SAW torque technology. Used in appropriate applications, complex control algorithm and system development, test, evaluation and qualification time can often be significantly reduced with real-time torque sensor measurement that can provide feedback for closed-loop control.

Surface Acoustic Wave (SAW) technology enables wireless, battery-less, non-contacting strain measurement often suitable for the measurement of torque, pressure, temperature and other parameters. The SAW propagation mode is characterized by velocities typically 5 orders of magnitude below electro-magnetic waves with amplitudes in the order of nanometers and wavelengths in micrometers. Most energy is confined to within one wavelength of the surface. These characteristics have made SAW devices often ideal for the design of delay lines and filters widely used in radar, TV and the mobile telecommunications industry. SAW devices are typically designed to operate within the frequency range 30 MHz to 3 GHz.

However, during the course of SAW torque sensor testing where the sensor button is attached to either a shaft or a plate, difficulties have occasionally arisen in maintaining the attachment of the sensor button to the device under torque. Adhesives have not been strong enough under some torque conditions and the sensor does not maintain contact.

It would be of advantage in the art if a device could be provided to attach a sensor such as a SAW torque sensor on a shaft or plate that maintains the sensor in contact with the device under any torque situation to which the device is intended to be used.

Yet another advantage would be if a device could be simply manufactured that would attach to a device to be used under torque.

Other advantages will appear hereinafter.

SUMMARY OF THE INVENTION

It has now been discovered that the above and other advantages of the present invention may be obtained in the following manner. Specifically, the present invention provides a retaining ring that holds sensors such as SAW torque sensor on a device such as a shaft or plate being subjected to torque.

The retaining ring is substantially hollow and has a first open end that allows the sensor to be inserted into the ring. The second end has a lip that extends inward from the ring periphery and overlaps the sensor in the ring. At least a portion of the outer periphery is threaded, preferably with fine threading. The device to which the sensor is to be attached, such as a shaft or plate, has a threaded recess or counter bore that is sized to accept and mate with the threaded outer portion of the retaining ring.

The sensor is held in place by the lip portion once the ring has been threaded onto the shaft, plate or the like.

BRIEF DESCRIPTION OF THE DRAWINGS

For a more complete understanding of the invention, reference is hereby made to the drawings, in which:

FIG. 1 is a top view of the preferred embodiment of the present invention; and

FIG. 2 is a side elevational view of the device of FIG. 1 shown in place on an element to be tested.

DETAILED DESCRIPTION OF THE PREFERRED EMBODIMENT

The present invention provides for substantial improvements in SAW torque sensors. Specifically, the device of this invention is a retaining ring that holds the sensor on the device being subjected to torque. The sensor 11 in FIG. 1 is a conventional SAW torque sensor but any sensor or other element that is to be attached to something being subjected to torque or other forces can benefit from this invention.

The retaining ring 13 holds sensor 11 on the device, in this illustration as shaft 15. Reference item 15 in FIG. 2 is a cross sectional view of a shaft 15, however, it could also be viewed as a cross sectional view of a plate 15. The ring 13 includes a lip portion 17 that is in contact with the top of the sensor 11, as shown in FIG. 2, and an adhesive 19 has been applied to the bottom or button part of sensor 11. Sensor connecting wires or leads 21 extend through an opening n the ring 13.

Retaining ring 13 also has a threaded portion 23 on the outer periphery of ring 13. The shaft 15 has threads 25 that are on the inside of recess or counter bore 27. Preferably the threads 23 and 25 are fine threads that give precise control over how tight the sensor 11 is held in contact in counter bore 27 with shaft 15 by lip 17. The adhesive 19 allows torque experienced by the shaft 15 to the sensor 11, such as the SAW button in that embodiment.

The retaining ring 13 should have some means for attaching it to the recess 27. Preferred would be a hex pattern 29 on the inside of the lip 17, as seen in FIG. 1.

While particular embodiments of the present invention have been illustrated and described, it is not intended to limit the invention, except as defined by the following claims.

The invention claimed is:

1. A device for mounting a sensor on a device being subjected to torque, comprising:
    a sensor having a contact portion thereof for contact with a device subjected to torque and an adhesive on said contact portion;
    a retaining ring having an opening sized to hold said sensor, said ring having a first open end for insertion of said sensor and a second end having a lip portion for retaining said sensor in said opening; and
    a threaded portion on the outer periphery of said retaining ring, said threaded portion being adapted to engage a threaded recess in said device being subjected to torque, whereby said sensor is attached to said device by threading said retaining ring onto said threaded recess on said device to maintain contact between said sensor and said device.

2. The device of claim 1, where said device is a rotating shaft.

3. The device of claim 1, wherein said device is a plate subject to torque.

4. The device of claim 3, wherein said second end in said retaining ring includes an opening wherein at least one lead connected to said sensor protrudes through said opening.

5. The device of claim 1, wherein said retaining ring includes a pattern on an inside of said lip portion of said ring for tightening said ring in said recess.

6. The device of claim 5 wherein said pattern comprises a hex pattern.

7. A device for mounting a sensor on a device being subjected to torque, comprising:
- a torque sensor having a contact portion thereof for contact with a device subjected to torque and an adhesive on said contact portion;
- a retaining ring for mounting said sensor and having an opening sized to hold said sensor, said retaining ring having a first open end for insertion of said sensor and a second end having a lip portion for retaining said sensor in said opening; and
- attachment means on the outer periphery of said retaining ring for engaging said device being subjected to torque, whereby said sensor is attached to said device to maintain contact between said sensor and said device.

8. The device of claim 7, where said device is a rotating shaft.

9. The device of claim 7, wherein said device is a plate subject to torque.

10. The device of claim 7, wherein said retaining ring includes an opening wherein at least one lead connected to said sensor protrudes through said opening.

11. The device of claim 7, wherein said retaining ring includes a pattern on an inside of said lip portion of said ring for tightening said ring to said device.

12. The device of claim 11 wherein said pattern comprises a hex pattern.

13. A method for mounting a sensor on a device being subjected to torque, comprising the steps of:
- placing a sensor having a contact portion thereof for contact with a device subjected to torque in a retaining ring having an opening sized to hold said sensor, said ring having a first open end for insertion of said sensor, a second end having a lip portion for retaining said sensor in said opening and a threaded portion on the outer periphery of said retaining ring;
- placing an adhesive on said contact portion;
- forming a threaded recess in said device being subjected to torque; and
- threading said retaining ring onto said threaded recess on said device to maintain contact between said sensor and said device.

14. The method of claim 13, where said device is a rotating shaft.

15. The method of claim 13, wherein said device is a plate subject to torque.

16. The method of claim 13, wherein said second opening in said retaining ring includes an opening wherein at least one lead connected to said sensor protrudes through said opening.

17. The method of claim 13 wherein said retaining ring includes a pattern on an inside of said lip portion of said ring for tightening said ring in said recess.

18. The method of claim 17 wherein said pattern comprises a hex pattern.

* * * * *